US006181023B1

(12) United States Patent
Inoue

(10) Patent No.: US 6,181,023 B1
(45) Date of Patent: Jan. 30, 2001

(54) DRSC CAR-MOUNTED EQUIPMENT AND DRSC APPARATUS USING THE SAME

(75) Inventor: Masahiro Inoue, Tokyo (JP)

(73) Assignee: Mitsubishi Denki Kabushiki Kaisha, Tokyo (JP)

( * ) Notice: Under 35 U.S.C. 154(b), the term of this patent shall be extended for 0 days.

(21) Appl. No.: 09/309,268

(22) Filed: May 11, 1999

(30) Foreign Application Priority Data

Dec. 11, 1998 (JP) ........................ 10-352838

(51) Int. Cl.[7] ........................ G01S 13/91

(52) U.S. Cl. ........................ 307/10.1; 307/9.1; 340/539; 340/825.72; 340/905; 455/70

(58) Field of Search ........................ 307/10.1, 9.1; 342/4; 340/905, 539, 825.72, 988; 455/70

(56) References Cited

U.S. PATENT DOCUMENTS 5,132,687 * 7/1992 Baldwin et al. ........................ 342/44
5,539,645 * 7/1996 Mandhyan et al. ........................ 340/905
5,847,663 * 12/1998 Chasek ........................ 455/70
6,072,421 * 6/2000 Fukae et al. ........................ 342/42

* cited by examiner

*Primary Examiner*—Albert W. Paladini
(74) *Attorney, Agent, or Firm*—Sughrue, Mion, Zinn, Macpeak & Seas, PLLC

(57) ABSTRACT

A DSRC car-mounted equipment which automatically drives a receiver circuit only when it is necessary to suppress the consumption of an electric power. A DSRC car-mounted equipment comprises a receiver circuit 3 driven upon being supplied with an electric power from a battery 6A, a receiver circuit drive means 4 for driving said receiver circuit, and a drive condition judging means 10 for judging the drive conditions of said receiver circuit drive means, wherein said drive condition judging means includes vibration data detecting means 12, 15 for detecting the vibration data B, F of said vehicle, and vibration data judging means 14, 17 for comparing the vibration data of said vehicle with reference values Cb, Cf, and wherein when said vibration data satisfy predetermined conditions for said reference values, judgement signals Da, Df for driving said receiver circuit are output to said receiver circuit drive means.

16 Claims, 7 Drawing Sheets

DRSC CAR-MOUNTED EQUIPMENT AND DRSC APPARATUS USING THE SAME

BACKGROUND OF THE INVENTION

1. Field of the Invention

The present invention relates to a car-mounted equipment of a dedicated short-range communication (hereinafter abbreviated as DSRC) system used for intelligent transport systems (hereinafter referred to as ITS) and, particularly, to a DSRC car-mounted equipment which automatically drives a receiver circuit only when it is necessary to suppress the consumption of an electric power and to a DSRC apparatus using the same.

2. Prior Art

In the DSRC car-mounted equipment used for the ITS, in general, a receiver circuit is maintained driven at all times whenever the vehicle is traveling so that a dedicated short-range communication is readily realized when it is required to make a communication with an on-the-road equipment.

FIG. 6 is a block diagram schematically illustrating a conventional DSRC car-mounted equipment and a peripheral constitution thereof. In FIG. 6, the DSRC car-mounted equipment 1 includes a receiver circuit 3 and a transmitter circuit (not shown) for executing the dedicated short-range communication with an on-the-road equipment 2 installed on a path along which the vehicle travels, and a receiver circuit drive means 4 for driving the receiver circuit 3.

The receiver-circuit drive means 4 in the DSRC car-mounted equipment 1 is connected to a battery 6 through an ignition switch 5. When the ignition switch 5 is turned on, the receiver circuit 3 is driven being served with an electric power from the battery 6 mounted on the vehicle.

When the ignition switch 5 is turned on, the receiver circuit drive means 4 is driven by the battery 6 at all times to supply an electric power to the receiver circuit 3.

FIG. 7 is a block diagram illustrating another prior art.

In FIG. 7, a receiver circuit drive means 4 in a DSRC car-mounted equipment 1 is directly connected to a battery 6A incorporated in the DSRC car-mounted equipment 1 separate from a battery 6 for ignition.

As is widely known, the battery 6A is constituted by a cell that is incorporated, a dry cell or a solar cell system.

In this case, the receiver circuit drive means 4 that is connected to the battery 6A continues to supply an electric power to the receiver circuit 3.

As is well known, a transmitter circuit that is not shown in the DSRC car-mounted equipment 1 is supplied with an electric power only when a request for transmission has occurred.

According to the conventional DSRC car-mounted equipment which is supplied with an electric power from the battery 6 mounted on the car as shown in FIG. 6, the receiver circuit drive means 4 continues to supply the electric power to the receiver circuit 3 when the ignition switch 5 is turned on, arousing a problem in that heat is generated by the receiver circuit 3 and by the receiver circuit drive means 4.

In particular, the DSRC car-mounted equipment is mounted near the dashboard in the room of the vehicle and is subject to be heated when it is irradiated with sunlight, and is generally placed under severe temperature conditions where the temperature may exceed 100° C. Accordingly, heat generated by the receiver circuit 3 and by the receiver circuit drive means 4 creates a serious problem.

Referring to FIG. 7, again, when the electric power is directly supplied from the battery 6A in the DSRC car-mounted equipment 1, the receiver circuit 3 is maintained supplied with the electric power even when it does not at all require the electric power such as when the vehicle is left to stand or when the DSRC car-mounted equipment 1 is carried away, leaving a problem in that the life of the battery 6A is shortened due to the continuous consumption of the electric power.

The present invention was accomplished in order to solve the above-mentioned problems, and its object is to provide a DSRC car-mounted equipment which automatically drives the receiver circuit only when it is necessary to suppress the consumption of the electric power, and a DSRC apparatus using the same.

The present invention is concerned with a DSRC car-mounted equipment for executing a dedicated short-range communication with an on-the-road equipment installed on a path along which the vehicle travels, comprising:

- a receiver circuit driven upon being supplied with an electric power from a battery;
- a receiver circuit drive means for driving said receiver circuit; and
- a drive condition judging means for judging the drive conditions of said receiver circuit drive means;
- wherein said drive condition judging means includes:
  - vibration data detecting means for detecting the vibration data of said vehicle; and
  - vibration data judging means for comparing the vibration data of said vehicle with reference values; and
- wherein when said vibration data satisfy predetermined conditions for said reference values, judgement signals for driving said receiver circuit are output to said receiver circuit drive means.

The invention is further concerned with a DSRC car-mounted equipment, wherein said vibration data is a vibration level, said reference value corresponds to a vibration level of said vehicle under predetermined traveling conditions of said vehicle, and said drive condition judging means outputs a judgement signal when said vibration level is greater than said reference value.

The invention is further concerned with a DSRC car-mounted equipment, wherein said vibration data is a vibration frequency, said reference value corresponds to a vibration frequency band under predetermined traveling conditions of said vehicle, and said drive condition judging means outputs said judgement signal when said vibration frequency represents said reference value.

The invention is further concerned with a DSRC car-mounted equipment, wherein said vibration data include a vibration level and a vibration frequency, said reference value includes a first reference value corresponding to a vibration level under predetermined traveling conditions of said vehicle and a second reference value corresponding to a vibration frequency band under predetermined traveling conditions of said vehicle, and said drive condition judging means outputs said judgement signal when said vibration level is larger than said first reference value and when said vibration frequency represents said second reference value.

The invention is further concerned with a DSRC car-mounted equipment, wherein said vibration data include a vibration level and a vibration frequency, said reference value includes a first reference value corresponding to a vibration level under predetermined traveling conditions of said vehicle and a second reference value corresponding to a vibration frequency band under predetermined traveling conditions of said vehicle, and said drive condition judging means outputs said judgement signal when said vibration level is larger than said first reference value or when said vibration frequency represents said second reference value.

The invention is further concerned with a DSRC car-mounted equipment, wherein said drive condition judging means includes a filter means for filtering said vibration data, and compares the vibration data after filtered with said reference value.

The invention is further concerned with a DSRC car-mounted equipment, wherein said drive condition judging means includes an external input switch, and said reference value is variably set depending upon an operation signal output from said external input switch when said external input switch is operated.

The present invention is further concerned with a DSRC car-mounted equipment, wherein said reference value is set being changed-over to a plurality of steps depending upon said operation signal.

The invention is further concerned with a DSRC car-mounted equipment, wherein said reference value is updated and set based upon the vibration data detected when said external input switch is operated.

The invention is further concerned with a DSRC car-mounted equipment, wherein said drive condition judging means includes a vehicle speed sensor for detecting the speed of said vehicle, and said reference value is variably set depending upon said vehicle speed.

The invention is further concerned with a DSRC car-mounted equipment, wherein said drive condition judging means includes:

- a memory means for storing vibration data over a predetermined period;
- a communication end signal-forming means for forming a communication end signal when the communication with the on-the-road equipment has ended; and
- a reference value-setting means which reads, from said memory means, the vibration data of just before the communication has started with the on-the-road equipment in response to the communication end signal and operates a reference value, and stores said reference value.

The invention is further concerned with a DSRC apparatus using a DSRC car-mounted equipment, comprising a plurality of dents and bumps formed maintaining a predetermined distance and a predetermined width on a predetermined region of the path along which the vehicle travels, wherein said drive condition judging means outputs said judgement signal in response to the result of comparison of a reference value corresponding to said dents and bumps with said vibration data.

The invention is further concerned with a DSRC apparatus, wherein said dents and bumps are formed on a region just preceding a communication region where there is installed an on-the-road equipment with which the communication is executed from the receiver circuit.

The invention is further concerned with a DSRC apparatus, wherein said dents and bumps are formed on a region just preceding a curved region of said traveling path.

The invention is further concerned with a DSRC apparatus, wherein said dents and bumps are formed on a region just preceding a sleep warning region of said traveling path.

The invention is further concerned with a DSRC apparatus, wherein the distance and the width of said dents and bumps are variably set depending upon different regions of said traveling path.

DESCRIPTION OF THE PREFERRED EMBODIMENTS

Embodiment 1

An embodiment 1 of the present invention will now be described with reference to the drawings.

Figure 1:
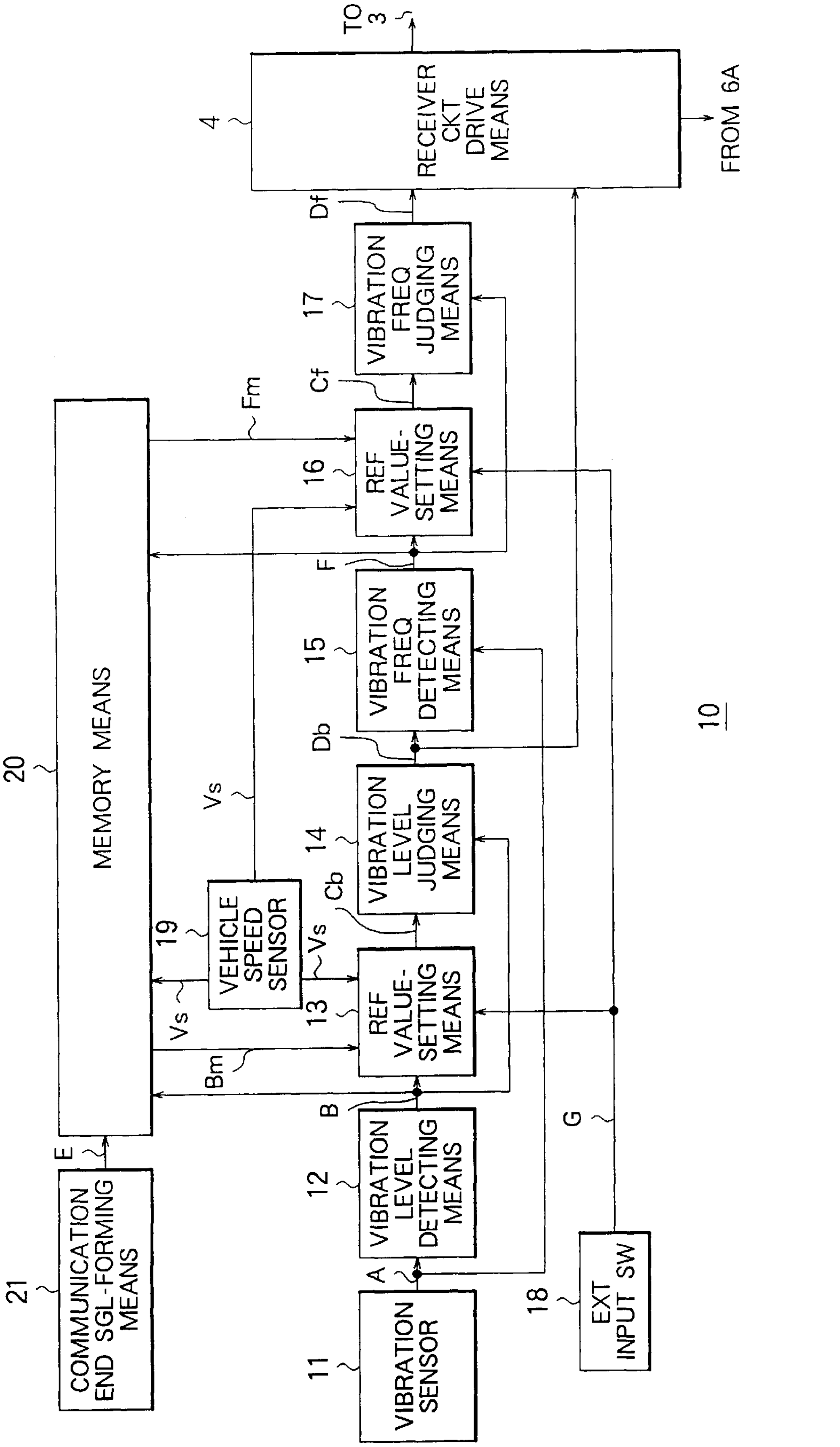
FIG. 1 is a block diagram illustrating a DSRC car-mounted equipment according to an embodiment 1 of the present invention.

FIG. 1 is a block diagram illustrating a DSRC car-mounted equipment according to the embodiment 1 of the present invention, wherein the same portions as those described above are denoted by the same reference numerals but are not described again in detail.

Figure 7:
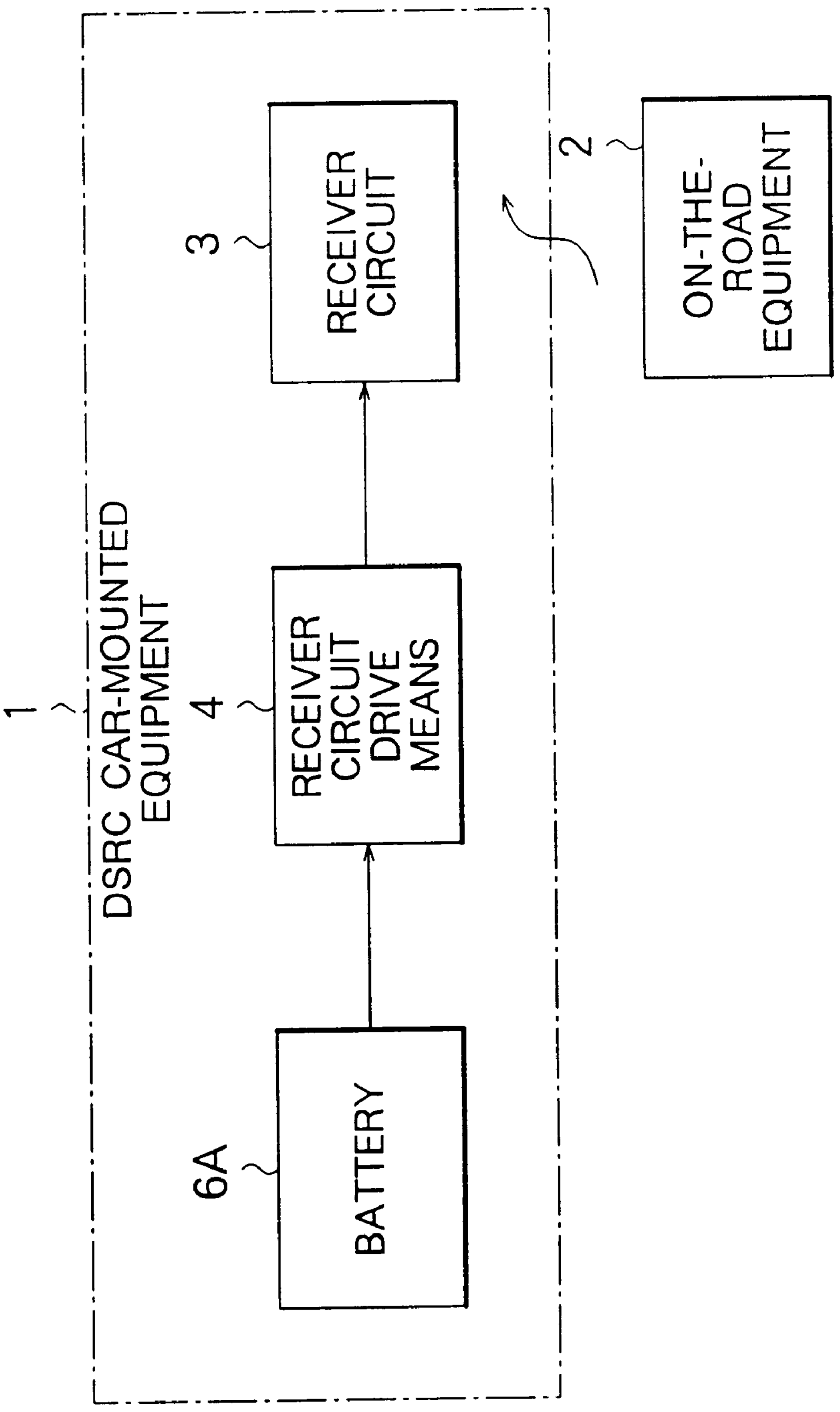
FIG. 7 PRIOR ART
FIG. 7 is a block diagram illustrating another conventional DSRC car-mounted equipment and a peripheral constitution.

The arrangement of the on-the-road equipment 2,receiver circuit 3 and battery 6A not shown in FIG. 1, is as shown in FIG. 7.

Here, the battery 6A incorporated in the DSRC car-mounted equipment is used. It is, however, also allowable to use the battery 6 mounted on the vehicle through the ignition switch 5.

In FIG. 1, the DSRC car-mounted equipment is further equipped with a drive condition judging means 10 for judging the drive conditions for the receiver circuit drive means 4 in addition to the above-mentioned receiver circuit 3 and the receiver circuit drive means 4.

When the vibration data satisfy predetermined conditions as will be described later, the drive condition judging means 10 outputs judgement signals Db and Df to the receiver circuit drive means 4 in order to drive the receiver circuit 3.

The drive condition judging means 10 includes a vibration sensor 11 for detecting vibration A of the vehicle, a vibration level detecting means 12 for detecting a vibration level B of vibration A, a reference value-setting means 13 for setting a reference value Cb for the vibration level B, and a vibration level judging means 14 for outputting a judgement signal Db when the drive conditions are satisfied as a result of comparing the vibration level B with the reference value Cb.

The drive condition judging means 10 further includes a vibration frequency detecting means 15 for detecting the vibration frequency F of vibration A in response to the judgement signal Db, a reference value-setting means for setting a reference value Cf of the vibration frequency F, and a vibration frequency judging means 17 for outputting a judgement signal Df when the drive conditions are satisfied as a result of comparing the vibration frequency F with the reference value Cf.

The vibration level detecting means 12 and the vibration frequency detecting means 15 constitute vibration data detecting means which, respectively, detect the vibration level B and the vibration frequency F which are vibration data of the vehicle.

The reference values Cb and Cf set by the reference value-setting means 13 and 16 are corresponding to the vibration level and to the vibration frequency band under the predetermined traveling conditions (drive conditions) of the vehicle.

The vibration level judging means 14 and the vibration frequency judging means 17 constitute a vibration data judging means for comparing vibration data of the vehicle with the reference values Cb and Cf. The vibration level judging means 14 produces a judgement signal Db when the vibration level B is greater than the reference value Cb, and the vibration frequency judging means 17 produces a judgement signal Df when the vibration frequency F represents the reference value Cf.

Here, the vibration level judging means 14 and the vibration frequency judging means 17 are connected in series, and the drive condition judging means produces a final judgement signal Df when the vibration level B is not smaller than the reference value Cb and when the vibration frequency F represents the reference value Cf.

The judgement signal Df only is used for driving the receiver circuit 3, and the judgement signal Db may be supplementarily used for judging a fault in the vibration frequency detection system.

When the judgement signals Db and Df are both equally handled and when either the vibration level B or the vibration frequency F satisfies the drive conditions, then, the receiver circuit 3 may be driven.

Figure 6:
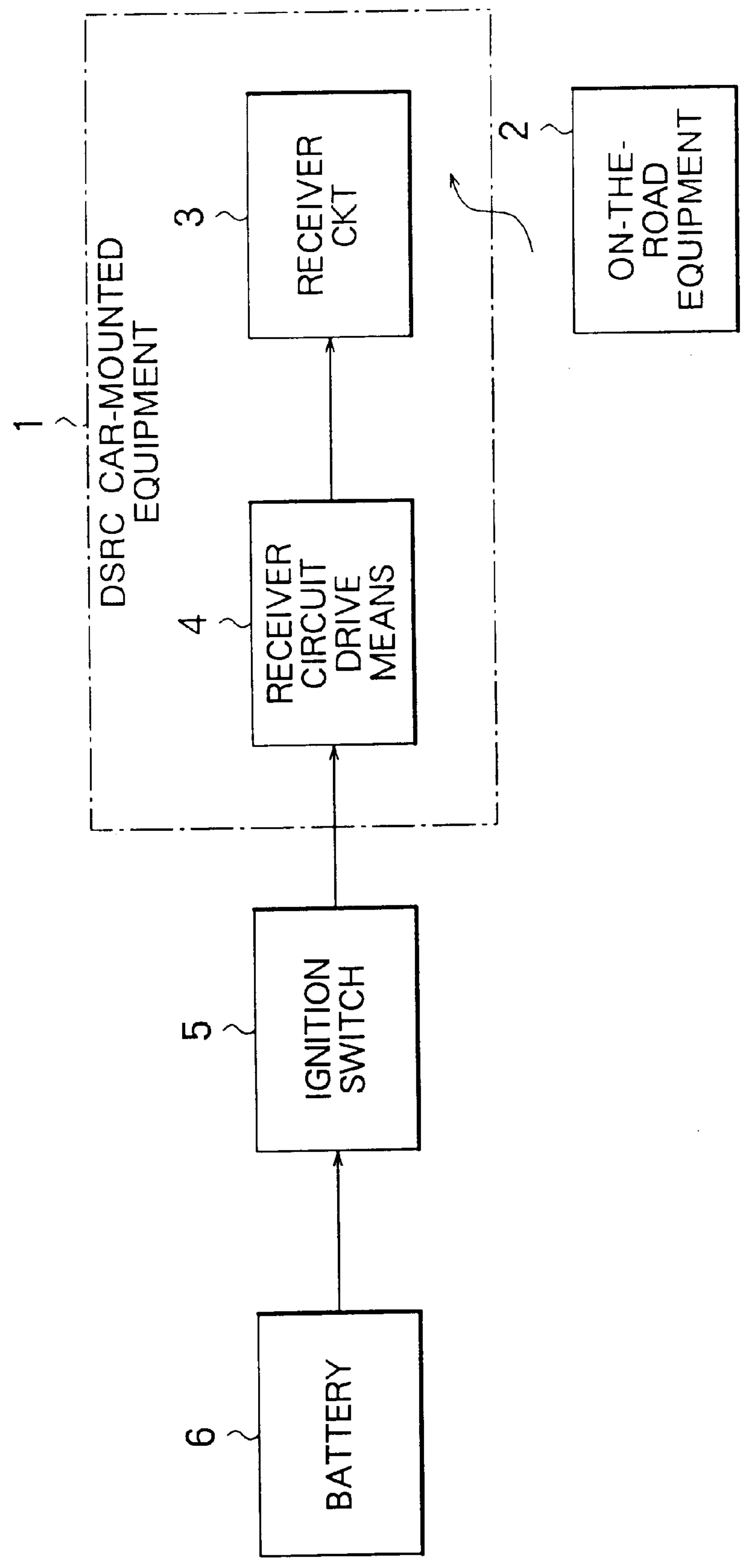
PRIOR ART FIG. 6
FIG. 6 is a block diagram illustrating a conventional DSRC car-mounted equipment and a peripheral constitution.

The drive condition judging means 10 further includes an external input switch 18 operated by a driver, a vehicle speed sensor 19 for detecting the speed Vs of the vehicle, a memory means 20 for storing the vibration data (vibration level B and vibration frequency F) over a predetermined period, and a communication end signal-forming means 21 for forming a communication end signal E when the communication with the on-the-road equipment 2 (see FIG. 6) has ended.

Upon being manipulated by the driver, the external input switch 18 forms an operation signal G which is input to the reference value-setting means 13 and 16, in order to variably set the reference values Cb and Cf.

Here, the operation signal G serves as a trigger signal for updating the reference value. The reference value-setting means 13 and 16 update the vibration data (vibration level B and the vibration frequency F) detected at the time when the external input switch 18 is operated, and set them as new reference values Cb and Cf.

The operation signal G from the external input switch 18 can be used to change and adjust the reference values Cb and Cf over a plurality of stages in order to correct differences in the vibration data B and F depending upon the models of vehicles.

The external input switch 18 comprises, for example, ten keys, and the reference values Cb and Cf can be manually and directly rewritten by using operation signals G that serve as data values.

The speed Vs detected by the vehicle speed sensor 19 is input to the reference value-setting means 13 and 16.

Therefore, the reference value-setting means 13 and 16 variably set the reference values Cb and Cf depending upon the vehicle speed Vs.

Furthermore, the reference value-setting means 13 and 16 have a calculation unit and a storage unit (not shown) that operate in response to the communication end signal E.

In response to the communication end signal E, therefore, the reference value-setting means 13 and 16 read, from the memory means 20, the vibration data (vibration level Bm and vibration frequency Fm) of just before the start of communication with the on-the-road equipment 2, in order to calculate the reference values Cb and Cf and to store the calculated reference values Cb and Cf.

Next, described below is the operation of the embodiment 1 of the present invention shown in FIG. 1.

First, while the vehicle is traveling, the vibration sensor 11 detects vibration A of the vehicle and of the DSRC car-mounted equipment, and the vibration level detecting means 12 detects the magnitude of vibration A as the vibration level B.

Next, the vibration level judging means 14 compares the vibration level B with the reference value Cb. When the vibration level B is greater than the reference value Cb, the vibration level judging means 14 so judges that the drive conditions are satisfied, and produces a judgement signal Db.

Then, the vibration frequency detecting means 15 detects the vibration frequency F, and the vibration frequency judging means 17 compares the vibration frequency F with the reference value Cf. When the vibration frequency F represents the reference value Cf, the vibration frequency judging means 17 so judges that the drive conditions are satisfied, and produces a judgment signal Df.

The judgement signal Df drives the receiver circuit drive means 4 whereby the receiver circuit 3 is supplied with an electric power from the battery 6A (or from the battery 6 through the ignition switch 5).

At this moment, the reference values Cb and Cf for determining the drive conditions of the receiver circuit 3 are variably set as described below depending upon the conditions.

That is, by using the external input switch 18 operated by the driver, the reference values Cb and Cf are variably set depending upon the will of the driver.

While steadily traveling on a stable traveling path, for example, the external input switch 18 is operated to form an operation signal G. That is, vibration data during the steady traveling are input to the reference value-setting means 13 and 16 which, then, set suitable reference values Cb and Cf with the vibration data as background levels.

In general, when a vehicle travels at a predetermined speed on, for example, a paved road, the vibration level B relative to a given vehicle speed assumes a nearly predetermined value that varies depending upon the model of the vehicle.

Therefore, the driver operates the external input switch 18 when he is traveling on an ordinary paved road which is not so rugged at a predetermined speed which may be, for example, about 60 kilometers an hour, in order to form an operation signal G which serves as an instruction for setting a reference value for detecting the vibration.

Based on the vehicle speed Vs and the vibration data B and F of when the operation signal G is input, the reference value-setting means 13 and 16 store the vibration data B and F of when the vehicle is normally traveling.

Furthermore, the reference value-setting means 13 and 16 estimate vibration data in a region preceding the communication region where the on-the-road equipment 2 is installed based on the vibration data B and F of when the operation signal G is input while the vehicle is normally traveling, and calculate and set reference values Cb and Cf that make it possible to reliably detect vibration data in the region preceding the communication region.

When the surface conditions of the road have been determined, the vibration data B and F in the region preceding the communication region are determined depending upon the model of the vehicle. Therefore, the reference values Cb and Cf are automatically set for detecting vibration data B and F specific to the region preceding the communication region.

Furthermore, when the vehicle is normally traveling at a speed Vs, the reference value-setting means 13 and 16 automatically and variably set the reference values Cb and Cf based upon the vibration level B and the vibration frequency F of when normally traveling.

Furthermore, when the communication is practically executed with the on-the-road equipment 2, the reference value-setting means 13 and 16 fetch, from the memory means 20, the vibration data (vibration level Bm and vibration frequency Fm) detected just prior to starting the communication, and automatically calculate the reference values Cb and Cf based upon the vibration data Bm, Fm and the vehicle speed Vs, and store the calculated results that have been updated as reference values Cb and Cf.

That is, the reference value-setting means 13 and 16 estimate and operate the reference values Cb and Cf from the vehicle speed Vs, vibration level Bm and vibration frequency Fm on the road just preceding the communication region where the on-the-road equipment 2 is installed.

Based on the reference values Cb and Cf that are estimated and operated, therefore, the vibration level judging means 14 and the vibration frequency judging means 17 compare and judge the vibration level B and the vibration frequency F that are detected in the next time, and drive the receiver circuit 3 when the above-mentioned drive conditions are satisfied.

When normally traveling as described above, the receiver circuit 3 and the receiver circuit drive means 4 are in a state where the main power source is turned off, and are driven only when the judgement signal Df is formed. This makes it possible to decrease the wasteful consumption of electric power, to prevent heat from wastefully generated by the DSRC car-mounted equipment and to prevent the battery 6A from being wastefully depleted.

When the vehicle is parking or is halting, furthermore, the power source circuit of the receiver circuit 3 is broken to prevent wasteful consumption of an electric power from the battery 6A. Therefore, the battery 6A is suppressed from being depleted, and the life of the battery 6A can be extended.

The reference values Cb and Cf are variably set in response to the operation signal G, vehicle speed Vs and communication end signal E, and are thus corrected so as to cancel dispersion in the vibration data (vibration level B and vibration frequency F) due to the vehicles of different models.

That is, reference values Cb and Cf are set from the vibration data during the normal traveling, preventing the receiver circuit 3 from being erroneously driven in the regions where communication is not required, and making it possible to reliably drive the receiver circuit 3 in the region preceding the communication region.

Moreover, the reference values Cb and Cf are highly accurately updated and set depending upon the vibration data during the practical traveling, and make it possible to more reliably prevent the receiver circuit 3 from being erroneously driven despite of vibration during the normal traveling.

Besides, not only the vibration level B but also the vibration frequency F are detected as vibration data, making it possible to highly accurately detect specific vibration only in the region preceding the communication region and to reliably drive the receiver circuit 3 on only the region preceding the communication region where it is required to drive the receiver circuit 3.

Furthermore, the reference values Cb and Cf for comparison and judgement are determined based upon the measured vibration data, making it possible to reliably cope with a change in the vibration data with the passage of time such as deterioration of the vehicle and, hence, to drive the receiver circuit 3 on a region preceding the communication region.

In response to the communication end signal E, furthermore, the reference values Cb and Cf are corrected based on the vibration level B and the vibration frequency F practically detected in a region preceding the communication region. It is thus made possible to drive the receiver circuit only when it is necessary by highly accurately judging the region preceding the communication region.

Embodiment 2

The above-mentioned embodiment 1 has employed both the vibration level B and the vibration frequency F as vibration data. However, either one of them may be employed.

When the vibration level B only is employed, for example, the reference value Cb is variably set based upon the vibration level of the engine by giving attention to the revolving state of the engine that differs depending upon the model, in order to reliably set an optimum reference value Cb depending upon the model of the vehicle.

When attention is given to the vibration frequency F produced by the revolution of the engine, the vibration frequency F at the start of the engine is detected by the vibration sensor 11, and the power source for the receiver circuit 3 is energized when the vehicle is in a state where it can be operated.

In general, the vibration frequency F of the four-cylinder engine is found from the following formula (1) relying upon the rotational speed Ne [rpm] of the engine.

$$F = Ne \times 4(\text{number of cyclinders})/(60\ [\text{sec}] \times 2[\text{rev}]) \qquad (1)$$

Based on the formula (1), the reference value Cf of vibration frequency F is set at a frequency slightly lower than the idling frequency. Accordingly, the receiver circuit 3 is driven when a vibration frequency F higher than the reference value Cf is detected.

Embodiment 3

In the above-mentioned embodiment 1, the reference value-setting means 13 and 16 have variably set the reference values Cb and Cf by fetching the vibration data of a background level in response to the operation signal G from the external input switch 18. However, it is also allowable to change-over and set a plurality of reference values that have been stored in advance in the reference value-setting means 13 and 16 in response to the operation signal G.

In this case, in order to compensate for a difference in the vibration data depending upon the vehicles, the driver manually forms the operation signal G for only a predetermined number of times depending upon the model of the vehicle, and selects the reference values Cb and Cf from the known values in order to change-over and adjust the reference values over a plurality of steps.

When, for example, attention is given to the vibration level B, the reference value Cb is set to a relatively small value in the case of a deluxe car that produces little vibration. In the case of a light four-wheeler that produces vibration in relatively large amounts, the reference value Cb is set to a relatively large value.

The reference value Cb of the vibration level B differs not only depending upon a deluxe car or a light four-wheeler but also upon a gasoline engine-mounted car or a diesel engine-mounted car. Therefore, the reference value is manually adjusted over a plurality of steps depending upon the model of the vehicle.

This eliminates the need of operating the reference values Cb an Cf, and the processing by the reference value-setting means 13 and 16 can be simplified.

Embodiment 4

In the above-mentioned embodiment 1, the vibration level B and the vibration frequency F were directly input to the judging means 13 and 17. It is, however, also allowable to insert filter means (not shown) between the vibration data detecting means 12, 15 and the judging means 13, 17, in order to compare the vibration data B and F after processed through the filters with the reference values Cb and Cf.

In this case, noise components contained in the vibration data are removed through the filters. Therefore, the drive conditions are highly reliably judged based upon the vibration data that are little affected by the noise components, and it is allowed to more reliably prevent the receiver circuit 3 from being erroneously driven.

Embodiment 5

In the above-mentioned embodiment, digitally processed judgement signals Db and Df were formed by the judging means 14 and 17 from the reference values Cb and Cf to judge the drive conditions. It is, however, also allowable to use the vibration data B and F which comprise analog values.

Embodiment 6

In the above-mentioned embodiment 1, the judging means 14 for the vibration level B and the judging means 17 for the vibration frequency F were arranged in series, and the drive conditions were established when both the judgement signals Db and Df were formed. It is, however, also allowable to arrange the judging means 14 and 17 in parallel to establish the drive condition relying upon either the judgement signal Db or the judgement signal Df.

Figure 2:
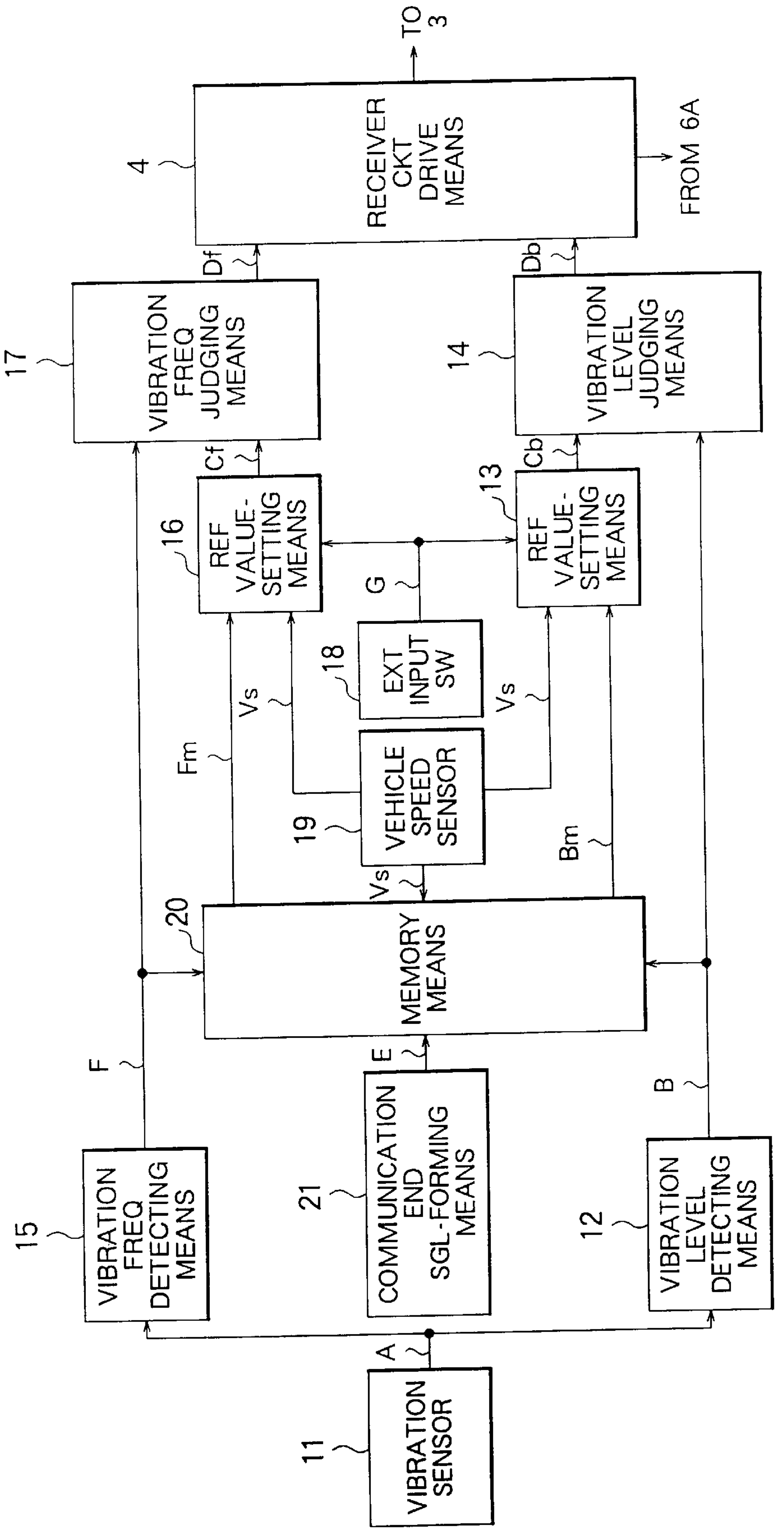
FIG. 2 is a block diagram illustrating the DSRC car-mounted equipment according to an embodiment 6 of the present invention.

FIG. 2 is a block diagram illustrating an embodiment 6 of the present invention, wherein the constitution is the same as that of FIG. 1 except that the judgement means 14 and 17 are arranged in parallel.

In this case, the receiver circuit drive means 4 is driven to drive the receiver circuit 3 in response to the judgement signal Db or Df that represents the establishment of at least one drive condition of either the vibration level B or the vibration frequency F.

Therefore, even if either system for detecting the vibration level B or the vibration frequency F is broken, the receiver circuit 3 is driven based on a judgement signal from the other detection system.

Embodiment 7

The above-mentioned embodiment 1 has dealt only with processing the vibration data in the DSRC car-mounted equipment without giving any particular attention to the conditions on the traveling path. In order to reliably drive the receiver circuit by highly reliably detecting the vibration data in a predetermined region, however, bumps and dents may be formed on the traveling path maintaining a predetermined distance and a predetermined width in relation to a predetermined region.

Figure 3:
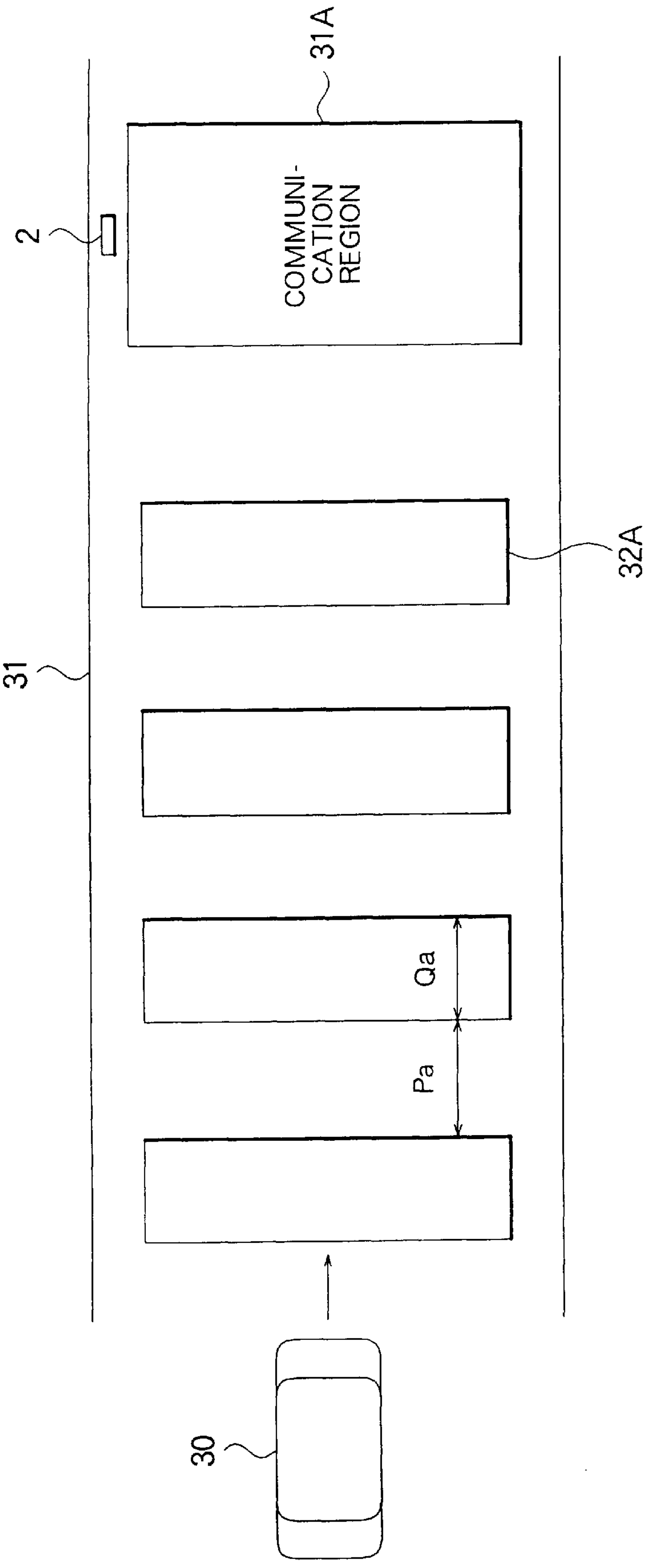
FIG. 3 is a plan view illustrating a traveling path in relation to a DSRC apparatus according to an embodiment 7 of the present invention.

FIG. 3 is a plan view illustrating a traveling path in relation to the DSRC apparatus according to an embodiment 7 of the present invention, wherein a predetermined region on the traveling path is a communication region. The vibration data detecting means, drive condition judging means and the like means in the vehicle 30 are constituted in the same manner as described above (see FIG. 1 or 2).

In FIG. 3, a communication region 31A on where the on-the-road equipment 2 is installed is existing ahead of the vehicle 30 traveling in the direction of an arrow.

On the traveling path 31 just preceding the communication region 31A, there are formed a plurality of dents and bumps 32A maintaining a predetermined distance Pa and a width Qa.

Referring to FIG. 3, when the vehicle 30 travels on the dents and bumps 32A formed on the traveling path 31, vibration generates in the vehicle 30 depending upon the dents and bumps 32A, and is detected by the vibration sensor mounted on the vehicle 30.

Hereinafter in the same manner as described above, the power source for the receiver circuit 3 is energized when the drive condition judging means 10 detects the vibration level B larger than the reference value Cb or the vibration frequency F representing the reference value Cf.

When the distance Pa and width Qa of the dents and bumps 32A have been known, the vibration frequency F due to the bumps and dents 32A is correctly determined from the vehicle speed Vs as a specific value. Therefore, the drive condition judging means 10 highly accurately judges that the vehicle is traveling on the region preceding the communication region 31A.

Therefore, the drive condition judging means 10 produces highly accurate judgement signals Db and Df in response to the result of comparison of the reference values Cb, Cf with the vibration data B F corresponding to the bumps and dents 32A, making it possible to reliably drive the receiver circuit 3.

When the communication is practically executed between the DSRC car-mounted equipment and the on-the-road equipment 2 due to the drive of the receiver circuit 3, the reference value-setting means 13 and 16 recognize the practical vibration data due to the dents and bumps 32A from the vibration level B, vibration frequency F and vehicle speed Vs detected while traveling through the region just preceding the communication region 31A in response to the communication end signal E in the same manner as described above.

Therefore, the reference value-setting means 13 and 16 automatically update and store optimum reference values Cb and Cf based on the measured values of vibration data corresponding to the dents and bumps 32A.

Here, the reference value Cb for the vibration level B is set as a value of comparison for detecting vibration, and the reference value Cf for the vibration frequency F is set as a specific frequency of a region preceding the communication region 31A.

Embodiment 8

In the above-mentioned embodiment 7, the dents and bumps 32A were formed in only a region just preceding the communication region 31A. It is, however, also allowable to form dents and bumps in the regions just preceding other regions.

Figure 4:
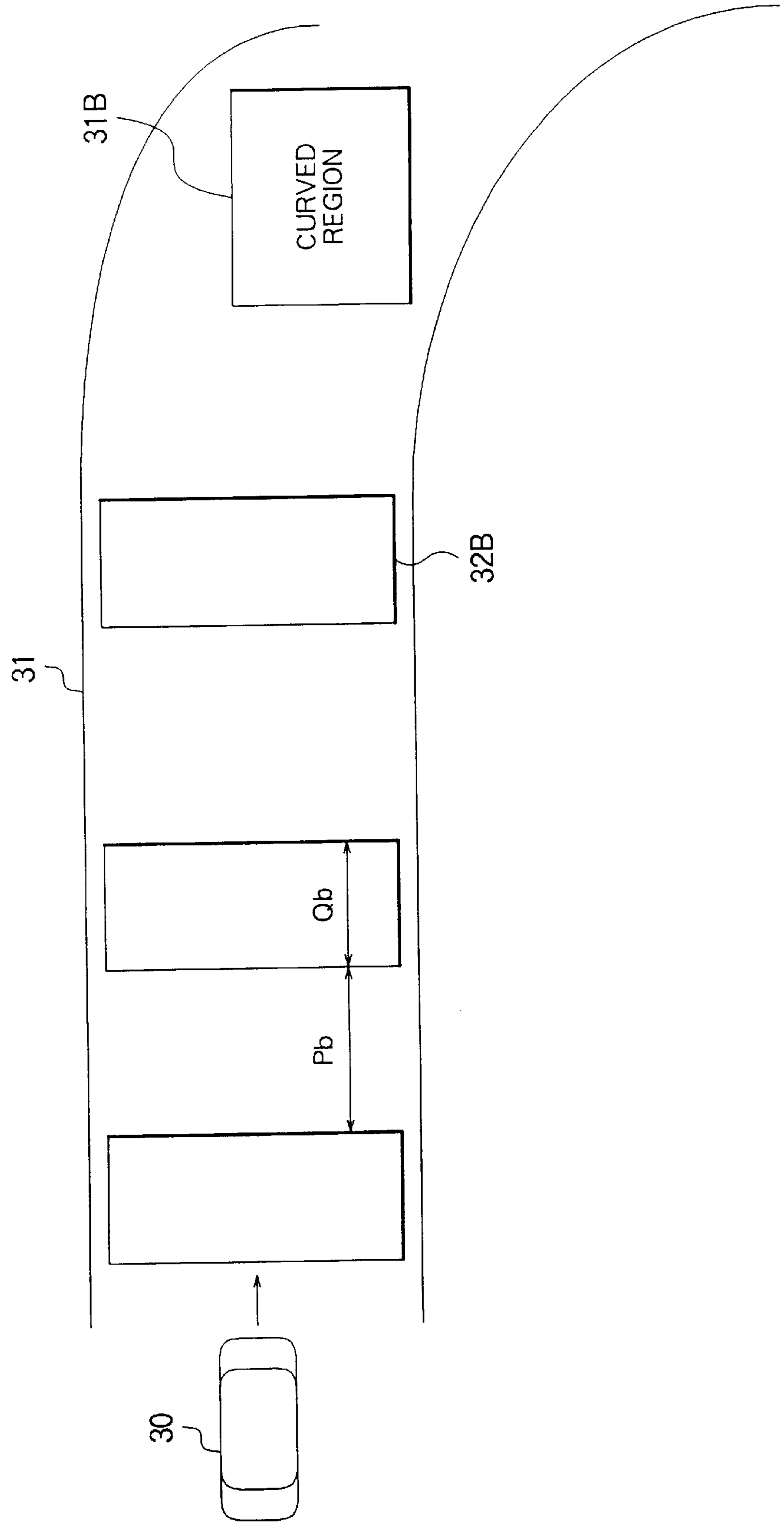
FIG. 4 is a plan view illustrating a traveling path in relation to a DSRC apparatus according to an embodiment 8 of the present invention.

FIG. 4 is a plan view illustrating a traveling path in relation to the DSRC apparatus according to an embodiment 8 of the present invention, wherein a predetermined region on the traveling path is a curved region.

In FIG. 4, a curved region 31B exists on the traveling path 31 ahead of the vehicle 30, and a plurality of bumps and dents 32B are formed on the traveling path 31 maintaining a predetermined distance Pb and a width Qb in a region preceding the curved region 31B.

In this case, the distance Pb and the width Qb of the dents and bumps 32B are larger than the distance Pa and the width Qa of the dents and bumps 32A that are formed in relation to the above-mentioned communication region 31A (see FIG. 3).

The drive condition judging means 10 in the vehicle 30 has been so constituted that the detection function can be arbitrarily changed over, so that the vibration frequency F specific to the dents and bumps 32B in the region preceding the curved region 31B can be judged by manipulating the external input switch 18.

Furthermore, the vehicle 30 carries an information means (not shown) such as of voice or buzzer.

Referring to FIG. 4, dents and bumps 32B having the specific distance Pb and width Qb are formed in the region just preceding the curved region 31B, whereby the drive condition judging means 10 judges that the vehicle is traveling the region just preceding the curved region 31B based upon the vibration frequency F.

When the vehicle 30 has approached the curved region 31B, therefore, the information means is driven in response to the judgement signal Df by using the vibration frequency-detecting function of the drive condition judging means 10, enabling the driver to be informed of that he is approaching the curved region 31B.

Embodiment 9

In the above-mentioned embodiment 8, dents and bumps 32B were formed in the region just preceding the curved region 31B. It is, however, also allowable to form dents and bumps in a region just preceding a sleep warning region.

Figure 5:
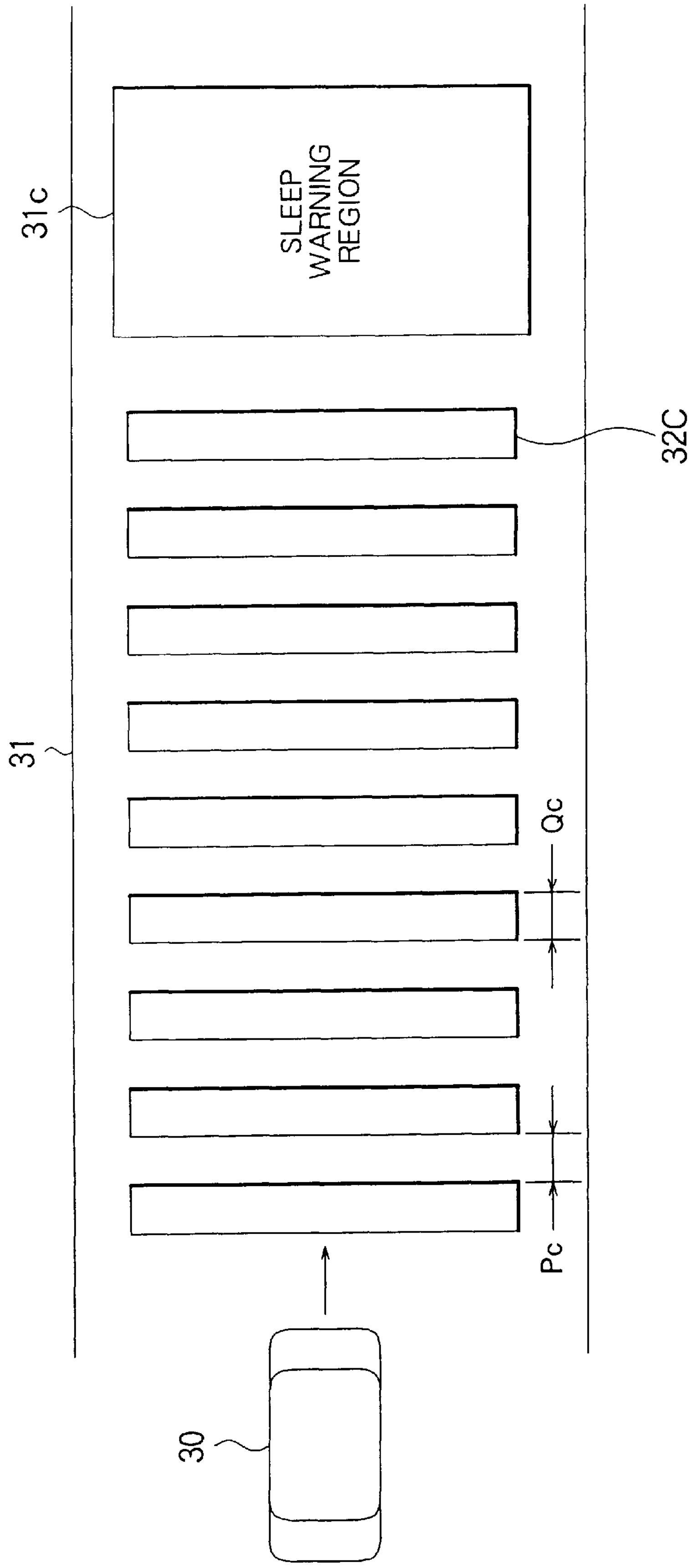
FIG. 5 is a plan view illustrating a traveling path in relation to a DSRC apparatus according to an embodiment 9 of the present invention.

FIG. 5 is a plan view illustrating a traveling path in relation to the DSRC apparatus according to an embodiment 9 of the present invention, wherein a predetermined region on the traveling path is a sleep warning region.

In FIG. 5, a sleep warning region 31C is existing on the traveling path 31 ahead of the vehicle 30, and a plurality of dents and bumps 32C are formed maintaining a predetermined distance Pc and a width Qc on the traveling path 31 in the region just preceding the sleep warning region 31C.

In this case, the distance Pc and the width Qc of the dents and bumps 32C are smaller than the distance Pa and the width Qa of the above-mentioned dents and bumps 32A (see FIG. 3).

The drive condition judging means 10 has been so constituted that the function can be arbitrarily changed over, so that the vibration frequency F specific to the dents and bumps 32C in the region preceding the sleep warning region 31C can be judged by manipulating the external input switch 18.

Referring to FIG. 5, dents and bumps 32C having the specific distance Pc and width Qc are formed in the region just preceding the sleep warning region 31C, whereby the drive condition judging means 10 judges that the vehicle is traveling the region just preceding the sleep warning region 31C based upon the vibration frequency F.

When the vehicle 30 has approached the sleep warning region 31C, therefore, the information means is driven in response to the judgement signal Df by using the vibration frequency-detecting function of the drive condition judging means 10, enabling the driver to be informed of that he is approaching the sleep warning region 31C.

Similarly, furthermore, dents and bumps having different distances and widths may be formed concerning other different regions on the traveling path 31 in addition to the sleep warming region 31C, making it possible to reliably judge the difference of the region existing ahead of the vehicle 30 based upon the specific vibration frequency F that is detected.

Therefore, the drive condition judging means 10 in the dsrc car-mounted equipment grasps the condition of the traveling path 31 on which the vehicle 30 is traveling based on the vibration frequency F, and the driver is informed of various alarms in advance depending upon the region on where he is traveling, making it possible to further enhance safety.

What is claimed is:

1. A DSRC car-mounted equipment for executing a dedicated short-range communication with an on-the-road equipment installed on a path along which the vehicle travels, comprising:

a receiver circuit driven upon being supplied with an electric power from a battery;

a receiver circuit drive means for driving said receiver circuit; and a drive condition judging means for judging the drive conditions of said receiver circuit drive means;

wherein said drive condition judging means includes:

vibration data detecting means for detecting the vibration data of said vehicle; and vibration data judging means for comparing the vibration data of said vehicle with reference values; and wherein when said vibration data satisfy predetermined conditions for said reference values, judgement signals for driving said receiver circuit are output to said receiver circuit drive means.

2. A DSRC car-mounted equipment according to claim 1, wherein said vibration data is a vibration level, said reference value corresponds to a vibration level of said vehicle under predetermined traveling conditions of said vehicle, and said drive condition judging means outputs a judgement signal when said vibration level is greater than said reference value.

3. A DSRC car-mounted equipment according to claim 1, wherein said vibration data is a vibration frequency, said reference value corresponds to a vibration frequency band under predetermined traveling conditions of said vehicle, and said drive condition judging means outputs said judgement signal when said vibration frequency represents said reference value.

4. A DSRC car-mounted equipment according to claim 1, wherein said vibration data include a vibration level and a vibration frequency, said reference value includes a first reference value corresponding to a vibration level under predetermined traveling conditions of said vehicle and a second reference value corresponding to a vibration frequency band under predetermined traveling conditions of said vehicle, and said drive condition judging means outputs said judgement signal when said vibration level is larger than said first reference value and when said vibration frequency represents said second reference value.

5. A DSRC car-mounted equipment according to claim 1, wherein said vibration data include a vibration level and a vibration frequency, said reference value includes a first reference value corresponding to a vibration level under predetermined traveling conditions of said vehicle and a second reference value corresponding to a vibration frequency band under predetermined traveling conditions of said vehicle, and said drive condition judging means outputs said judgement signal when said vibration level is larger than said first reference value or when said vibration frequency represents said second reference value.

6. A DSRC car-mounted equipment according to claim 1, wherein said drive condition judging means includes a filter means for filtering said vibration data, and compares the vibration data after filtered with said reference value.

7. A DSRC car-mounted equipment according to claim 1 wherein said drive condition judging means includes an external input switch, and said reference value is variably set depending upon an operation signal output from said external input switch when said external input switch is operated.

8. A DSRC car-mounted equipment according to claim 7, wherein said reference value is set being changed-over to a plurality of steps depending upon said operation signal.

9. A DSRC car-mounted equipment according to claim 7, wherein said reference value is updated and is set based upon the vibration data detected when said external input switch is operated.

10. A DSRC car-mounted equipment according to claim 1, wherein said drive condition judging means includes a vehicle speed sensor for detecting the speed of said vehicle, and said reference value is variably set depending upon said vehicle speed.

11. A DSRC car-mounted equipment according to claim 1, wherein said drive condition judging means includes:

a memory means for storing vibration data over a predetermined period;

a communication end signal-forming means for forming a communication end signal when the communication with the on-the-road equipment has ended; and a reference value-setting means which reads, from said memory means, the vibration data of just before the communication has started with the on-the-road equipment in response to the communication end signal and operates a reference value, and stores said reference value.

12. A DSRC apparatus using a DSRC car-mounted equipment according to claim 1, comprising a plurality of dents and bumps formed maintaining a predetermined distance and a predetermined width on a predetermined region of the path along which the vehicles travels, wherein said drive condition judging means outputs said judgement signal in response to the result of comparison of a reference value corresponding to said dents and bumps with said vibration data.

13. A DSRC apparatus according to claim 12, wherein said dents and bumps are formed on a region just preceding a communication region where there is installed an on-the-road equipment with which the communication is executed from the receiver circuit.

14. A DSRC apparatus according to claim 12, wherein said dents and bumps are formed on a region just preceding a curved region of said traveling path.

15. A DSRC apparatus according to claim 12, wherein said dents and bumps are formed on a region just preceding a sleep warning region of said traveling path.

16. A DSRC apparatus according to claim 12, wherein the distance and the width of said dents and bumps are variably set depending upon different regions of said traveling path.

* * * * *